United States Patent
Vlot et al.

(10) Patent No.: US 9,959,394 B2
(45) Date of Patent: May 1, 2018

(54) DEVICE FOR DECRYPTING AND PROVIDING CONTENT OF A PROVIDER AND METHOD FOR OPERATING THE DEVICE

(71) Applicant: Vodafone GmbH, Düsseldorf (DE)

(72) Inventors: Marnix Vlot, Düsseldorf (DE); Christoph Schaaf, Düsseldorf (DE)

(73) Assignee: VODAFONE GMBH (DE)

( * ) Notice: Subject to any disclaimer, the term of this patent is extended or adjusted under 35 U.S.C. 154(b) by 114 days.

(21) Appl. No.: 14/735,560

(22) Filed: Jun. 10, 2015

(65) Prior Publication Data

US 2015/0363575 A1 Dec. 17, 2015

(30) Foreign Application Priority Data

Jun. 16, 2014 (EP) .................................... 14002070

(51) Int. Cl.
*G06F 21/10* (2013.01)
*H04L 9/32* (2006.01)

(52) U.S. Cl.
CPC .......... *G06F 21/10* (2013.01); *G06F 21/105* (2013.01); *H04L 9/3247* (2013.01);
(Continued)

(58) Field of Classification Search
CPC ............................. G06F 21/10; H04L 9/3247
(Continued)

(56) References Cited

U.S. PATENT DOCUMENTS

| 2002/0099948 A1* | 7/2002 | Kocher ................. G06F 21/10 713/194 |
| 2005/0105727 A1* | 5/2005 | Takashima ............. G06F 21/10 380/201 |

(Continued)

OTHER PUBLICATIONS

Eskicioglu et al., "An overview of multimedia content protection in consumer electronic device", Elsevier, vol. 16, Issue 7, Published Apr. 2001.*

*Primary Examiner* — Chau Le
*Assistant Examiner* — Dereena Cattungal
(74) *Attorney, Agent, or Firm* — Innovation Counsel LLP

(57) ABSTRACT

The invention relates to a device for decrypting protected content and for providing the decrypted content for playback. The device comprises one or more system software modules providing functions for facilitating the decryption of the protected content and at least one client software module assigned to a provider of protected content. The client software module is adapted to access functions of the system software modules in order to control the system software to decrypt the protected content of the provider. Moreover, the device is adapted to validate the system software and/or a further client software module and to prevent the decryption and/or provision of the protected content of the provider, if the system software and/or the further client software module are not validated successfully. The validation of the system software and/or a further client software module comprises a comparison of identification data of software modules of the system software and/or further client software modules loaded in a processor of the device and identification data included in a revocation list assigned to the provider. In addition to the device, the invention relates to a method for operating the device.

17 Claims, 1 Drawing Sheet

(52) U.S. Cl.
CPC .......... *H04L 9/3263* (2013.01); *H04L 9/3268* (2013.01); *G06F 2221/0724* (2013.01); *H04L 2209/603* (2013.01)

(58) Field of Classification Search
USPC .......................................................... 726/29
See application file for complete search history.

(56) References Cited

U.S. PATENT DOCUMENTS

| | | | | |
|---|---|---|---|---|
| 2008/0098212 | A1* | 4/2008 | Helms | H04L 63/0428 713/155 |
| 2008/0313264 | A1* | 12/2008 | Pestoni | G06F 21/10 709/202 |
| 2009/0049309 | A1* | 2/2009 | Brinker | G06F 21/57 713/189 |
| 2009/0132823 | A1* | 5/2009 | Grimen | H04N 7/1675 713/171 |
| 2010/0287363 | A1* | 11/2010 | Thorsen | G06F 21/575 713/2 |
| 2011/0196793 | A1* | 8/2011 | Zheng | G06Q 30/00 705/50 |
| 2011/0219229 | A1* | 9/2011 | Cholas | G06F 21/00 713/168 |
| 2011/0243458 | A1* | 10/2011 | Yoshioka | G06T 1/0021 382/209 |
| 2012/0233036 | A1* | 9/2012 | Mirashrafi | G06Q 30/00 705/27.2 |
| 2013/0251146 | A1* | 9/2013 | Roelse | H04L 9/0825 380/210 |
| 2014/0090075 | A1* | 3/2014 | Verma | G06F 21/10 726/26 |
| 2015/0304736 | A1* | 10/2015 | Lal | G06F 21/10 380/210 |
| 2016/0036808 | A1* | 2/2016 | Li | H04L 9/006 726/6 |
| 2016/0154744 | A1* | 6/2016 | Zheng | H04L 9/0822 713/193 |

\* cited by examiner

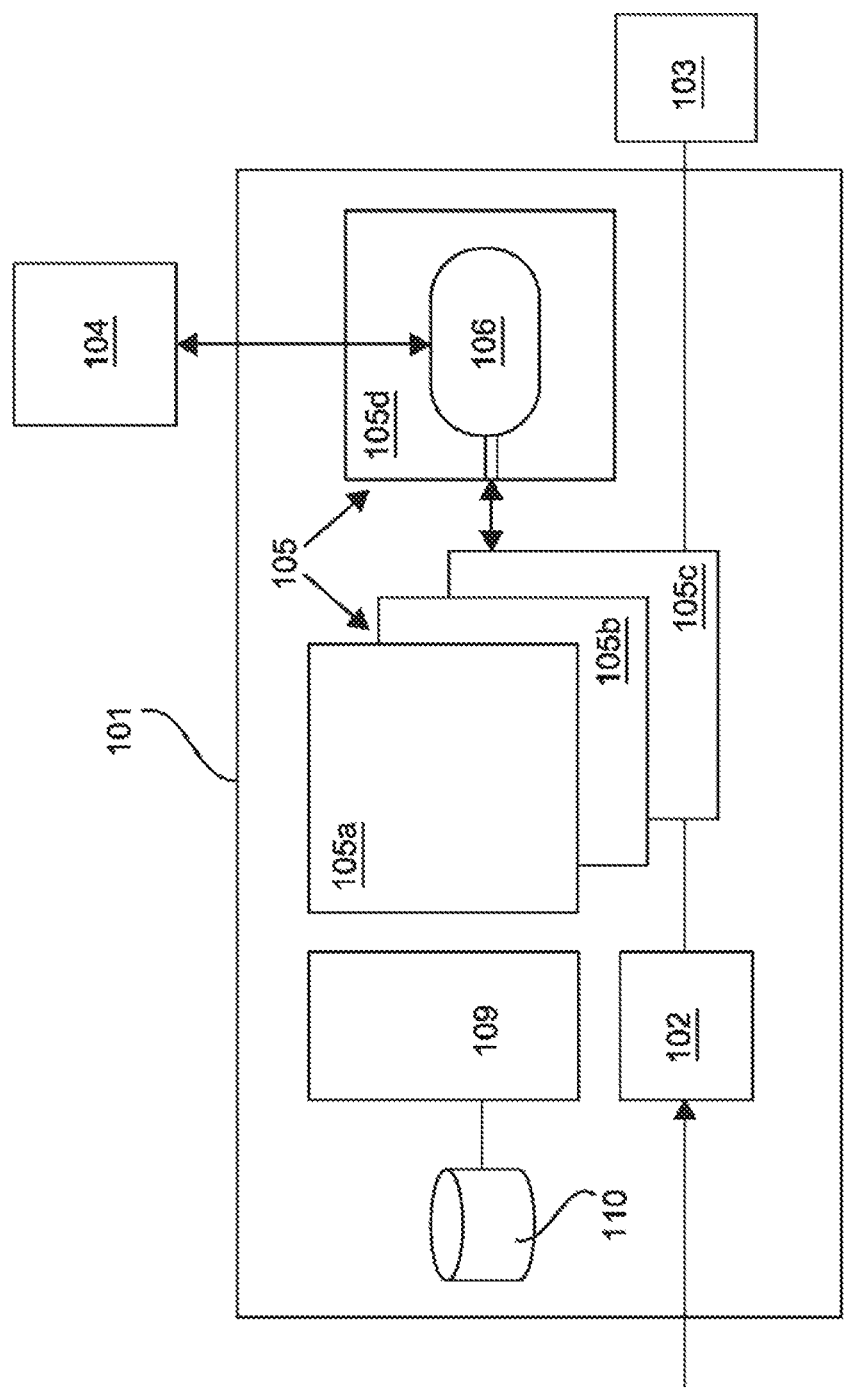

DEVICE FOR DECRYPTING AND PROVIDING CONTENT OF A PROVIDER AND METHOD FOR OPERATING THE DEVICE

CROSS-REFERENCE TO RELATED APPLICATIONS

This application claims benefit of priority to European Patent Application No. EP14002070 filed on Jun. 16, 2014, the entire contents of which is incorporated herein by reference.

DESCRIPTION

The invention relates to content protection systems, such as conditional access (CA) and/or digital rights management (DRM) systems, which employ cryptographic techniques to manage access to content transmitted to user devices. More specifically, the invention relates to a device for decrypting protected content and for providing the decrypted content for playback. Moreover, the invention relates to a method of operating such a device.

Content protection systems are essential in the rapidly developing area of digital broadcast. In such systems, content is usually provided in a cryptographically protected form so that users have to decrypt the content before it can be played back. The cryptographic information necessary for decrypting the content is provided to authorized user devices in a secure manner to thereby only allow such user devices to access and render the protected content. Thus, content providers can control which user devices can access their content and they can also define criteria under which authorized users can access the content using their user devices.

Such user devices are configured as so-called consumer premises equipment (CPE), such as set top boxes, special TV sets or the like, which comprise the hardware and software necessary for securely decrypting the content and for securely communicating with the provider side. In conventional content protection systems, such user devices are proprietary devices which are manufactured and provisioned under the control of the content provider. Thus, the content provider itself can ensure that the user devices utilized in his content protection system are sufficiently secure in order to prevent any tempering. While proprietary user devices ensure a high level of security, it is a drawback of such devices that they affect the flexibility for users to change to different content providers and/or use services of several content providers. So, users usually need a new or additional user device, when they change the content provider or subscribe to services of a further content provider. This is cumbersome for users and expensive for content providers as they have to provide each new user with a device for accessing their services.

Therefore, new user devices have recently been suggested, which are capable to be used in content protection systems of different content providers. So, the European Telecommunications Standards Institute (ETSI) is currently standardizing a hardware and software platform for such user devices which uses the so-called Embedded Common Interface (ECI). This platform is particularly disclosed in the white paper "ISG ECI: Industry Specification Group on Embedded Common Interface for exchangeable CA/DRM solutions" which can be retrieved under http://portal.etsi.org/ECI/ETSI%20ISG%20ECI%20White%20Paper-v1_20.pdf. This platform comprises the device hardware for accessing protected content and communicating with the provider side of content protection systems. Further, the platform comprises a system software which provides general functions for use in connection with different content protection systems. Furthermore, for each content provider, a provider-specific client software can be installed. This client software comprises provider-specific functions and can be executed within an environment of the system software, which provides interfaces for accessing and controlling the functions of the user device. When the user wishes to subscribe to a new content provider, the client software for this provider can easily be installed in the user device in addition to or as a replacement of the existing client software.

In such user devices, a content provider thus only controls his client software and does no longer control the devices' hardware and the system software, which provides security related functions, such as cryptographic algorithms and further security mechanisms. Thus, the content provider may not be in a position to prevent that tampered software is used in a user device or that the device software is inappropriate for other reasons.

Therefore, there is a need for a mechanism to allow a content provider to discover software that is tampered with and/or inappropriate for other reasons and to take actions to prevent misuse of his content by user devices comprising such software.

In order address this need, the invention suggests a device according to claim 1 and a method according to claim 14. Embodiments of the device and the method are given in the dependent claims.

According to a first aspect, the invention suggests a device for decrypting protected content and for providing the decrypted content for playback. The device comprises one or more system software modules providing functions for facilitating the decryption of the protected content and at least one client software module assigned to a provider of protected content. The client software module is adapted to access functions of the system software modules and to control the system software to decrypt the protected content of the provider. Moreover, the device is adapted to validate the system software modules and/or a further client software module and to prevent the decryption and/or provision of the protected content of the provider, if the system software and/or the further client software module are not validated successfully. The validation of the system software and/or a further client software module comprises a comparison of identification data of software modules of the system software and/or further client software modules loaded in a processor of the device and identification data included in a revocation list assigned to the provider.

According to further aspect, the invention suggests a method of operating a device for decrypting protected content and for providing the decrypted content for playback. The device comprises one or more system software modules providing functions for facilitating the decryption of the protected content and at least one client software module assigned to a provider of protected content. A client software module is adapted to access functions of the system software modules in order to control the system software to decrypt the protected content of the provider. In the method, the device validates the system software modules and/or a further client software module and prevents the decryption and/or provision of the protected content of the provider, if the system software and/or the further client software module are not validated successfully, the validation of the system software and/or a further client software module comprising a comparison of identification data of software modules of the system software and/or further client software modules loaded in a processor of the device and identification data included in a revocation list assigned to the provider.

Thus, it is possible for a first content provider to configure the device such that it does not decrypt and/or provide his content for playback, if the device executes system software modules and/or a client software module of second content providers, which are considered to be inappropriate by the first content provider. Advantageously, the software validation is specifically executed for an individual content provider for which a client software module is installed in the device. Thus, content of a further provider can still be decrypted and provided for playback, if the software validation for the first content provider is not successful.

In one embodiment, the identification data for a software module comprises a digest of an image of the software module. The digest may particularly be a hash value of the image of the software module. Such a digest uniquely identifies a software image and does also represent its content. So, a different digest is calculated for a software image after the software image has been modified. Thus, it is an advantage of this embodiment that not only the identity of the loaded software modules but also their integrity is checked in the validation process.

In a further embodiment of the invention, the identification data of the system software modules comprise a digest of digests of images of a sequence of software modules. This embodiment takes advantage of the fact that the system software of a device usually includes a particular sequence of software modules providing the functions of the system software. By a sequence-based validation of such software modules, the data volume of the identification data and the number of necessary comparison for validating sequences of software modules can be reduced.

Moreover, one embodiment of the device and the method provides that the image of each software module is provided with a digital signature created using a first cryptographic key uniquely allocated to the software image and wherein the device comprises a loader module adapted to verify the digital signature of a software image using a second cryptographic key allocated to the software module before a software module is loaded into a processor of the device. In particular, the first and second cryptographic keys may be the secret and public keys of an asymmetric key pair allocated to the software module.

In this embodiment, the loader module particularly verifies the integrity of the software image of the system software modules and the client software module before these software modules are loaded into a processor of the device. Thus, the loader module ensures that it is not possible to load modified software images into the processor. The loader module may be part of the general security architecture of the device, and the check of the software modules which is executed by the loader module may be independent of the provider-specific validation of such software modules.

In one embodiment of the device and the method, the provider-specific validation process relies on the integrity check of the loaded software modules made by the loader module. In this embodiment, the identification data used for validating a system software module or a further client software module uniquely identify the second cryptographic key allocated to the image of the software module. Thus, the device may store data identifying the second cryptographic keys allocated to the images of the software modules loaded into a processor of the device after their integrity has been checked by the loader module. These data identifying the second cryptographic keys are compared with data identifying second cryptographic keys specified in the revocation list provided by the content provider in order to carry out the provider-specific validation process.

In a related embodiment of the invention, the device is configured to validate the second cryptographic key using a digital certificate including the second cryptographic key, and the data uniquely identifying the second cryptographic comprise an identification of the digital certificate.

A first content provider may consider a client software module of a second content provider to be inappropriate due to the software release of this client software module as such. However, it is likewise possible that the client software module which corresponds to a software release which the first provider considers to be appropriate as such is operated by the second content provider in such a way that it affects the operation of the client software module of the first content provider. Thus, the first content provider may also regard a further client software module as being inappropriate, if it is assigned to a specific second content provider.

Therefore, one embodiment of the device and the method provides that the validation of the further client software module comprises checking whether the further client software is operated to control the device to decrypt and provide protected content of a provider that belongs to a predetermined group of providers. When it is determined that the further client software module is operated to control the device to decrypt and provide protected content of a provider that belongs to the predetermined group, the validation of the further client software module may be unsuccessful.

In a further embodiment of the device and the method, the validation of the system software and/or the further client software module is only made, if the device is included in a predetermined group of devices. This embodiment makes it possible for a content provider to restrict the provider specific validation of the software configuration to specific devices. These may e.g. be older devices or devices which likely comprise inappropriate software for other reasons. In other devices, the provider specific validation process may not be carried out so that the performance of these devices is not affected by this validation process which may consume a considerable amount of resources of a device.

In a related embodiment of the device and the method, the validation is only made, when a validation mode is activated in the device, and the validation mode is activated in response to a control message sent to the user device by the content provider. Thus, the provider specific validation process is restricted to the group of devices for which the content provider has activated the validation mode.

In a further embodiment, the revocation list provided by the content provider specifies the devices belonging to the predetermined group of devices and the device initiates the validation after it has determined that the device belongs to the group of devices defined in the revocation list.

In one embodiment of the device and the method, the client software module is adapted to forward a control word for decrypting the protected content of the provider to the system software, and the client software does not forward the control word, if the system software and/or the further client software module is not validated successfully. Hereby it can be efficiently prevented that the device decrypts protected content of the provider, if the validation is not successful.

In a further embodiment of the device and the method, the device is configured to suspend decryption and/or provision of the protected content of the provider, if the system software modules and/or the further client software module are not validated successfully. This embodiment makes it possible that the device starts decryption and provision of the content of the provider, before the provider-specific validation process has been completed. This prevents any delay in the playback of the content of the provider due to the provider-specific validation process. If the validation process is then completed unsuccessfully, the device suspends the decryption and/or provision of the content of the provider.

As already explained above, an unsuccessful validation of the software configuration of the device made for one content provider may not affect the decryption and/or provision of protected content of a further provider. Therefore, one embodiment of the device and the methods provides that the content provided by a further content provider is decrypted and provided for playback, if the system software modules and/or the further client software module are not validated successfully.

The aforementioned and other aspects of the invention will also be apparent from and elucidated with reference to the embodiments described hereinafter making reference to the drawings in which FIG. 1 is a schematic depiction of components of a user device according to the invention FIG. 1 shows a user device 101 which is adapted to receive protected content via a suitable reception interface 102. The user device 101 is configured as a set top box, a special hardware module within a TV set or another CPE.

The protected content may be transmitted to the user device 101 via a broadcast transmission channel, which may include a satellite broadcast channel, a cable broadcast channel and/or a terrestrial radio broadcast channel. In the case of a transmission of the protected content via a broadcast transmission channel, the same content is usually simultaneously transmitted to a plurality of user devices 101. In addition or as an alternative, the protected content may also be transmitted to the user device 101 individually upon on a corresponding request of the user device 101. In this case, the protected content may e.g. be downloaded to the user device via an Internet Protocol (IP)-based data network.

The protected content may include audio and/or video programs, such as television programs, movies, pieces of music and the like. The user device 101 is capable of accessing (i.e. decrypting) the protected content and of forwarding the protected content to a suitable playback device 103. The playback device 103 may be a physically separated device connected to the user device 101, or the user device 101 and the playback device 103 may be components of an integrated apparatus. The protected content is transmitted to the user device 101 in an encrypted and/or scrambled form (both is commonly referred to as encryption herein). The user device 101 descrambles or decrypts (commonly referred to as decrypting herein) the protected content, if the user operating the user device 101 is authorized to access the protected content. After the decryption is made, the user device 101 forwards the decrypted content to the playback device 103.

Encryption of the protected content is made by the content provider on the basis of a suitable encryption algorithm using a secret key. For decrypting the content, the user device uses a corresponding decryption key which is also referred to as control word herein. In principle, any encryption and decryption scheme known to a person skilled in the art may be used to encrypt the content at the provider side and decrypt the content in the user device 101. One example of a suitable encryption and decryption scheme is the ISO MPEG Common Encryption standard.

Different content providers which provide content that can be received in the user device 101, may use the same encryption scheme and individual provider-specific encryption and decryption keys for protecting their content. Thus, only one decryption algorithm corresponding to the common encryption scheme needs to be supported by the user device 101. However, the user device 101 may likewise support different decryption algorithms so that it is capable of accessing content provided using different encryption schemes corresponding to the decryption algorithms.

In one embodiment, the control word is specified in a message transmitted to the user device 101 by a provider server 104 operated by the content provider. The message may be transmitted together with the protected content through the same transmission channel as a so-called Entitlement Control Message (ECM). In alternative embodiments, the control word may be specified in a message transmitted to the user device 101 via a different transmission channel. In case of a broadcast transmission of the protected content to a plurality of users, all users may decrypt the content using the same control word. In order to prevent the control word from being discovered and used by unauthorized users, the control word may only be valid during a limited period of time, which is also referred to as cryptoperiod hereinafter. The cryptoperiod may have a length between several seconds and one or several minutes, for example. After the cryptoperiod for one control word is expired, the provider encrypts the content using a new key, and transmits a message specifying the new control word which is used for decrypting the content within the user devices 101 for the next cryptoperiod.

Particularly if the protected content is transmitted to the user device 101 individually upon request, the control word may be specific to content and/or the user. In this case, a change of control words may be dispensed with.

For performing the functions required to decrypt the protected content and to forward the content to the playback device 103, the user device 101 comprises a suitable hardware configuration and suitable software. The hardware configuration may comprise one or more processors, memory for storing the software and further data and further hardware components, such as the required physical interfaces for receiving and forwarding the content and further information, such as the messages specifying the control word and preferably further control messages sent by the content provider. In order to prevent sensible cryptographic operations to be tampered with, the hardware is secured against attacks for discovering secure data and operations using techniques known to the person skilled in the art.

The software of the user device 101 comprises a system or host software 105 which provides functions that can be used in connection with accessing content provided by different content providers. In one embodiment, the system software comprises a plurality of software modules, each software module providing one function or one group of functions of the system software 105. By way of example, four software modules 105a-d are shown in FIG. 1. One software module 105c of the system software 105 includes the decryption algorithm(s) for decrypting the protected content. Thus, upon receipt of the content through the reception interface 102, the content is processed in the decryption software module 105c. If the content can be successfully decrypted in the decryption software module 105c, it is forwarded to the playback device 103. In order to be able to decrypt content, control words are provided to the decryption software module 105c in a way to be described below. In addition to the decryption software module 105c, the system software 105 may comprise a web browser which may particularly allow for accessing a web interface of the content provider using the user device 101, and the system software 105 may contain further software modules for controlling the operation of the user device 101.

Moreover, the software configuration of the user device 101 comprises at least one client software module 106 which provides functions that are specific to a certain content provider. The client software module 106 may be provided under the control of the content provider to which the client software module 106 belongs. In one embodiment, the client software module 106 may be downloaded to and installed in the user device 101 during its operation using a secure download and installation mechanism. In principle, any such mechanism known to the person skilled in the art can be used for this purpose. Likewise, it is possible to install the client software module 106 already at the time of manufacture of the user device 101.

Although only one client software module 106 is shown in FIG. 1, a plurality of client software modules 106 assigned to different content providers may be installed in the user device 101. Preferably, it is also possible to add client software modules 106 during the operation of the user device 101 by securely downloading such client software modules 106 to and install them in the user device 101 using the secure download and installation mechanism. Thus, a new client software module 106 for a content provider can be added, when the user has subscribed to the services of a new content provider. This makes it possible to access the services of the new content provider using the same user device 101. Furthermore, the user device 101 preferably allows for deleting installed client software modules 106. So, a client software module 106 may be deleted, when the user does no longer wish to access services of this content provider. After deletion of a client software module 106, the resources that were assigned to this client software module 106 may be used to install a new client software module 106 allocated to a different content provider.

As said above, each client software module 106 provides operator specific functions executed in the user device 101. In particular, a client software module 106 is configured for communication with the provider server 104 of the content provider to which the client software module 106 is assigned. For this purpose, the client software module 106 is configured to receive and process messages of the provider server 104 including the messages specifying the control word to be used for decrypting the protected content of the content provider. In the processing of such messages, the client software module 106 reads the control words from the messages or derives the control words from the information included in the messages and forwards the control word to the decryption software module 105c of the system software so that the decryption software module 105c can use the control word to decrypt content of the content provider. Moreover, the client software module 106 may be configured to receive and process further messages sent by the provider server 104. In particular, it may receive and process control messages of the content provider which control access rights of the user device 101 to access content of the content provider. Using such messages, the content provider may e.g. define which content can be accessed by the user device 101 and potential further requirements for accessing such content. Such further requirements may include restrictions to access the content to certain times (e.g. certain times of a day and/or days of the week) or the requirement to make a payment in order to access certain content. The communication between the provider server 104 and the client software module 106 of the same provider is preferably secured using cryptographic techniques. In particular, a secure transport key may be established which is shared between the provider server 104 and the client software module 106 of the provider, which is used for decrypting the messages.

In order to execute one or more client software modules 106, the system software 105 of the user device 101 provides software containers 105d which correspond to a software environment or framework for executing the client software modules 106. Preferably, one container (i.e. one container instance) is provided for each client software module 106 installed and executed in the user device 101. A container 105d provides interfaces 108 (one of which is shown in FIG. 1 by way of example) which can be used for forwarding data to the client software module 106 within the user device 101 and for receiving data from the client software module 106 and for accessing the functions of the system software 105.

The program data of the software modules of the system software 105 and the program data of the client software module(s) 106, which are also referred to as software images herein, are loaded into the processor(s) of the user device 101 using a loader module 109. The loader module 109 is provided for validating the software modules, before they can be loaded into a processor of the user device 101. In one embodiment, the user device 101 is configured such that all software modules or a predetermined subgroup of software modules which are executed in the user device 101 can only be loaded via the loader module 109. The predetermined sub-group of software modules may include software modules providing security-related functions in the user device 101. Thus, it is ensured at least for security-related functions of the user device 101 that only certified software images are loaded and that these software images have not been modified.

Preferably, the loader module 109 is configured as a separate hardware block or processor of the user device 101, which is configured in a tamperproof way. In particular, the loader module 109 may be configured such that it is not possible circumvent the validation procedure executed in the loader module 109, when the relevant software modules (i.e. all software modules or the predetermined group of software modules) are loaded. Moreover, the loader module may be configured such that it is not possible to manipulate the validation process.

In the validation process carried out in the loader module 109, identification data of the software images are used. The identification data may include an indication of the software issuer (in case of the system software, this may be the device manufacturer, for example) and an indication of the software version. Moreover, the identification data include a digital signature. In one embodiment, the digital signature comprises a digest of the software image including the identification data, which is encrypted using a secret key. The digest may particularly be a hash value, which may be calculated using any hash algorithm known to a person skilled in the art. One hash algorithm which can be used for this purpose is the Secure Hash Algorithm (SHA). In one embodiment, the secret key (as well as the associated public key used for verifying the digital signature) is allocated to the specific software release represented by the software image. Thus, the secret key (and the associate public key) represents a specific version of the software.

In order to validate a software image, the loader module 109 checks whether it is allowed to load the software image and verifies the integrity of the software image using the digital signature. In particular, the loader module 109 may use the public key associated with the secret key used for generating the digital signature to decrypt the encrypted data of the digital signature. This public key is read from a corresponding digital certificate, after this certificate has been verified using a so-called root certificate and possibly further certificates of a certificate chain stored within the user device 101. Valid digital certificates may be installed in the user device 101 (only) for those software images which the user device is allowed to load. After decryption of the digital signature, the loader module 109 compares the included hash value of the software image with a hash value of the software image to be loaded, which has been calculated in the loader module 109 using the same hash algorithm. If both hash values correspond to each other, the validation of the software image is successful. Only in this case, the loader module 109 loads the software image into a processor of the user device 101. If the software image cannot be successfully validated, loading of the software image is denied.

Such a validation is preferably carried out at least for those software images of the system software, which provide security-related functions in the user device 101. In a further embodiment, it is also possible to validate each software image before it is loaded into a processor in the user device 101. In addition to the software images of the system software 105 selected for validation, the loader module 109 preferably also validates the software images of the client software modules 106 in the way described above before they are loaded into a processor and executed within a container 105d provided by the system software 105.

Moreover, the loader module 109 stores information about the software images which have been successfully validated (and loaded) in a database 110. Preferably, information about all software images that have been successfully validated and loaded during the current operation session (i.e. after the last start of the user device 101) are stored in the database 110. Thus, the database 110 holds information identifying all validated software images which have been loaded to achieve the currently running software configuration of the user device 101.

As will be explained in more detail hereinafter, the information in the database 110 may be used to perform further provider-specific validation processes to validate the software configuration of the user device 101. In one embodiment of a provider-specific validation process, the information stored in the database 110 may include the digests which have been calculated for the loaded software images by the loader module 109. In a further embodiment, the information includes at least part of the further identification data of the loaded software modules. In particular, data identifying the public keys included in the certificates used for validating the software modules may be stored in the database 110, when the public keys represent the software release as explained above. Such data may comprise identifications of the used digital certificates.

The digital certificates for validating (accepted) software modules may be issued by a trust authority that has the task to manage the software configuration of a certain group of user devices 101. The trust authority may also communicate with the user device 101 in order to update stored digital certificates. It is possible that the device manufacturer acts as trust authority and/or that the trust authority is identical to the aforementioned certification authority which certifies the accepted software images. Likewise it is possible that the trust authority is a different entity. However, it is assumed that the trust authority does not represent the content providers.

A content provider may consider a software module executed in the device as not being appropriate, although this software module was accepted by the trust authority has been successfully verified by the loader module 109.

The reason for a content provider to regard a software image accepted by the trust authority as not being appropriate could be that the user device 101 does not execute up-to-date versions of software modules, but older versions thereof. Such older version of a software module may not interact properly with the client software module 106 of the content provider so that errors may occur in the operation of the client software module 106, when the software module is running. The reasons for a content provider to regard a software image as not being appropriate may relate to the system software. In addition, such reasons may relate to the client software modules 106 which are executed in addition to the client software module 106 of a provider. Moreover, it usually cannot be entirely avoided that fraudulent client software modules 106 are installed on the user device 101, which can be used for attacks on the security architecture of other client software modules 106 or can affect the operation of other client software modules 106 in another way. Moreover, it is possible that a client software module 106b is appropriate as such, but is operated by the provider using this client software module 106 in such a way that it conflicts with other client software modules 106 which are being executed simultaneously.

Therefore, the user device 101 is configured such that it allows a content provider to suspend the delivery of services through a user device 101 which executes a system software module 105i or a client software module 106 not being regarded as appropriate by the content provider or which execute a client software module 106 which is operated in a way which is regarded as being inappropriate by the content provider. In particular, the user device 101 is configured to run a provider-specific validation process for validating the system software and/or further client software modules on a basis of validation information provided by the content provider and assigned to his client software module 106. This provider-specific validation process can be carried out in connection with the initialization of the provider's client software module 106, and, if the validation is not successful, delivery of services is suspended for the associated content provider. The delivery of services offered by other content providers through other client software modules 106 is not affected. In other words, each content provider may have the software configuration validated independent of the other content providers for which client software modules 106 are installed and/or executed in the user device 101. So, every content provider can define his own standards as regards to the software configuration, and when the software configuration of the user device 101 does not meet the standard of one operator, the user device 101 can still be used for accessing services of other content providers which have a different standard.

The provider-specific validation process is preferably executed during an initialization phase of the client software module 106 allocated to the provider after the client software module 106 of the provider has been loaded into a processor of the user device 101. In the validation process, information is used about the software modules loaded within the user device 101, which is stored in the database 110. In addition, data about appropriate software images are used which are provided by the content provider. These data comprise a revocation list, which may specify software modules which are not appropriate (so-called blacklist). However, it is likewise possible to define the appropriate software images within the revocation list (so-called whitelist).

In one embodiment, the revocation list is included in the provider's client software module 106. However, it is likewise possible that the revocation list is stored in the user device 101 independent of the provider's client software module 106. In both embodiments, the content provider can preferably transmit a new revocation list from the provider server 104 to the user device 101 and/or the provider can replace an existing revocation list stored in the user 101 with a new revocation list within the scope of a communication between the provider server 104 and the client software module 106.

The provider-specific validation process may be carried out by any secured component of the user device 101, which has access to the revocation list and to the database 110. So, in one embodiment, the client software module 106 performs the validation. For this purpose, the client software module 106 may include the revocation list provided by the content provider and may be granted access to the database 110. In an alternative embodiment, the loader module 109 or another module of the user device 101 may be responsible for the validation. For carrying out the validation, the revocation list may be provided to this module. This may be done by the client software module 106 which includes the revocation list and/or receives the revocation list from the provider server 104. Moreover, the module is configured to access the database 110 to read the identification data stored in the database 110 and compare it with the information included in the revocation list.

In one embodiment, the provider-specific validation process is based on a check of the digests of the loaded software images which have been stored in the database 110 by the loader module 109. In this embodiment, the revocation list may include digests of software images which are not appropriate (blacklist). These hash values may be compared with the digests stored in the database 110. If the comparison leads to the determination that at least one digest stored in the database 110 corresponds to a digest in the revocation list, the validation of the software configuration is not successful. On the other hand, the validation of the software configuration is successful, if none of the digests in the database 110 matches a digest in the revocation list.

In such a way all loaded software images for which information is stored in the database 110 may be validated. Likewise, the validation may be restricted to a subgroup of all loaded software images which may be defined in the revocation list in addition to the digests of the software images which are not appropriate. The subgroup may be defined by specifying characteristics of the software images which are also stored in the database 110 in allocation to the digests when the software images are loaded. Possible characteristics are the functions that the software provides and the software issuer. Thus, the validation can e.g. be restricted to images of software modules which provide certain functions within the user device 101, which the provider considers especially critical for the proper operation of his client software module 106, and/or to images of software modules of one or more predetermined software issuers. If such a restriction of the validation process is indicated in the revocation list, only the digests for the software images selected for validation are compared with the digests stored in the revocation list. Hereby, the number of necessary comparisons can be reduced and, thus, the validation process can be accelerated.

As explained above, it may also be possible that the revocation list defines the software images which are regarded as being appropriate (whitelist). In this case, the validation of the software configuration is successful if each digest in the database 110 corresponds to one digest included in the revocation list. Also in this case, it is again possible to restrict the validation to software images having certain characteristics defined in the revocation list and stored in the database 110 for the loaded software images.

Moreover, with respect to system software 105 the provider-specific validation process may not be made for individual software modules of the system software 105 but for sequences of software modules, because the system software 105 usually consists of a sequence of certain software modules providing the functions of the system software 105. Such sequences may be identified using a hash value or another function derived from the digests of images of the software modules included in the sequence. Therefore, a further embodiment provides that the revocation list identifies one or more appropriate sequences (whitelist) or inappropriate sequences (blacklist) of software modules of the system software by specifying the hash value or other function of the digests of the software images of such sequences. In this embodiment, the loader module 109 also stores in the database 110 the hash value or other function of the digests of the software images of the system software that have been loaded after validation in the loader module 109. When carrying out the provider specific validation process in this implementation, the data in the revocation list and the data in the database 110 are again compared with each other in order to validate the loaded sequence of software modules. Such sequence-based validation allows for reducing the amount of data to be stored in the revocation list and the database 110 and the number of required comparisons.

It is an advantage of the aforementioned embodiments that a client software module 106 can directly check identity and integrity of the loaded software images on the basis of their digests which are particularly configured as has values. In alternative embodiments, the provider-specific validation process partly relies on the verification of the software images which has been made on the basis of the digests by the loader module 109 before. In such embodiments, the validation process uses other identification data than the digests for the loaded software images. For this purpose, the loader module 110 stores the relevant identification data of the loaded software images in the database 110, and the revocation list may comprise identification data for software images which are not appropriate (blacklist).

In order to validate the software configuration, the identification data items included in the revocation list are compared with the identification data items stored in the database 110 (where each identification data item pertains to one software image). In particular, the revocation list may include data identifying the public keys pertaining to software releases which are not appropriate (if such keys identify the software modules and their version). As said above, these identification data may particularly correspond to the identifications of the public keys used for verifying the software modules. In case the identification data of the public keys allocated to the software images are included in the revocation list, these data are compared with the identification data of the public keys used for validating the loaded software images which are stored in the database 110. Again, the comparison between the identification data stored in the database 110 and the identification included in the revocation list can be done by the client software module 106 which may access the database 110 for this purpose, or the comparison can be carried out in the loader module 109 or another module of the user device 101. The validation is successful, if it is determined that none of the identification data items stored in database 110 corresponds to an identification data item included in the revocation list. On the other hand, if there is a match between an identification data item included in the revocation list and an identification data item stored in the database 110, the validation is not successful.

As alternative to a revocation list including identification data specifying software images which are not appropriate, the provider may again provide a revocation list that specifies software images which are appropriate (whitelist). In this case, it is checked during the provider-specific validation process whether the identification data items of the loaded software images, which are stored in the database 110, match identification data items specified in the revocation list. Only, if there is a match for each identification data item stored in the database 110, the provider-specific validation is successful.

Also in these embodiments in which the provider specific validation is made on the basis of other identification data of the software images than their digests, the validation may be restricted to loaded software images which have a certain characteristic. As also explained above in connection with the validation made on the basis of the digests of the software images, these characteristics may e.g. include the function of the software and the issuer of the software images. In order to allow for such restriction, the relevant characteristics are stored in the database 110 for the software images loaded by the loader module, and the revocation list specifies the characteristics of the software images for which the validation is to be executed.

While the provider-specific validation processes explained so far allow for determining loaded software modules which the provider considers not appropriate as such (i.e. where the provider considers the software releases to be not appropriate), a content provider may in addition or as an alternative specify in the revocation list that further client software modules 106 are not appropriate if they are allocated to certain further providers.

For this purpose, the content provider may identify the relevant further providers in the revocation list (blacklist). If the revocation list includes such information about further providers, it is checked during the provider-specific validation process whether client software modules 106 have been loaded which are allocated to providers identified in the revocation list. For this check, information identifying the provider is used, which is stored in the user device 101 in association with the client software modules 106 installed in the user device 101. In this embodiment, the validation is only successful, when none of the loaded client software modules 106 are allocated to a provider identified in the revocation list.

As an alternative, the provider may identify in the revocation list further providers which are considered "safe providers", where a client software module 106 allocated to a "safe provider" is regarded as being appropriate (whitelist). In this case, the validation is successful, if all loaded client modules are allocated to providers identified in the revocation list.

Moreover, it is preferably possible for a provider to activate the provider-specific validation only for certain user devices 101, while this validation is not carried out in other user devices 101. This option is useful, if a provider knows that only some user devices 101 potentially comprise inappropriate software while other devices do usually not include inappropriate software. In this regard, a provider may e.g. discover that inappropriate (e.g. older) software is only found in older user devices 101 and/or in user devices 101 of certain manufacturers. If a provider has ascertained that only some user devices 101 potentially include inappropriate software for these or other reasons, he may restrict the provider-specific software validation to these devices and may not activate the provider-specific validation for all other devices. This prevents the other devices' performance from being affected by the validation process which may use considerable device resources during the initialization phase of the provider's client software module 106 and, thus, may cause some delay in the provision of the provider's content. Moreover, the validation process can lead do other undesirable consequences in certain user devices 101, such as unwanted complete shutdowns in case of stopping the provision of content of one provider, so that the provider may not want to execute the provider-specific validation process in these user devices 101.

The provider-specific validation process may be deactivated in the user device 101 by default. In order to activate the provider-specific validation process for a certain user device 101, the provider may send the revocation list explained above to the user device 101. By transmitting the revocation list only to those user devices 101, in which the provider-specific validation process shall be carried out, the provider, can select the user devices 101 for executing the validation process. As an alternative, the revocation list may be transmitted on the provider's initiative to all user devices 101 which comprise a client software module 106 for the provider, or such user devices 101 may retrieve the revocation list from a server operated by the content provider, and this revocation list may specify the user devices 101 which shall execute the provider-specific validation. These user devices 101 may be individually specified in the revocation list using identification data uniquely assigned to these user devices 101, or the revocation list may specify certain types of user devices 101 selected for executing the provider specific validation. The received revocation list may be stored in the user device 101, and when the client software 106 of the provider is started, the user device 101 reads the revocation list and initiates the validation process. If a revocation list includes information about the user devices 101 which shall carry out the validation process, the user device 101 checks upon reading of the revocation list, whether it belongs to the group of user devices 101 specified in the revocation list and initiates the validation process only, if this check is affirmative.

In a further embodiment, the content provider permanently activates the validation mode for his client software module 106 in a user device 101. For activating the validation mode, the content provider may transmit a control message to the user device 101 separately form the revocation list and in a secured way, and the control message instructs the user device 101 to activate the validation note for the provider. In particular, the control message may include a credential, such as a digital signature, which allows the user device 101 to verify that the control message originates from a (trusted) content provider that has a client software module 106 installed in the user device 101. For this purpose, the user device 101 may e.g. use a digital certificate for the content provider, which is installed in the user device 101. Upon receipt of the control message and upon a successful verification of the control message, the user device 101 stores an indication that the validation mode is activated for this content provider.

When the client software module 106 of the provider is started, the user device 101 recognizes the indication and initiates the validation process. In so doing, the user device 101 firstly checks whether it has received a revocation list from the content provider. If it is determined as a result of this check that the user device 101 disposes of a revocation list for the provider, the provider-specific validation process is carried as explained above. Otherwise, i.e. if it is not determined that the user device 101 disposes of a revocation list for the provider, the validation process is finished with an unsuccessful result.

Thus, it is an advantage of this further embodiment, that the validation process ends with an unsuccessful result, if the revocation lists have not been received in the user device 101, because the transmission of the revocation lists have been (intentionally) blocked or for other reasons. Hereby, the security against tampering of the user device 101 is improved.

As said above, the provider-specific validation process is preferably carried out during the initialization of the client software module 106. For executing this validation process, a time limit may be set in the user device 101 which may be specified by the content provider (e.g. it may be specified within the control message for activating the validation mode for the content provider). The validation process is (only) successful, if all software modules, which are subject to the provider-specific validation, are validated successfully within the time limit. If the time limit expires before all software modules for which the validation is to be executed have been successfully validated, the validation process is completed unsuccessfully.

In one embodiment, the client software module 106 only starts its normal operation after the software configuration of the user device 101 has been validated successfully. This does particularly mean that the client software module 106 does only forward the control word for decrypting content of the content provider associated with client software module 106 after the successful validation of the software configuration. Thus, content of the content provider cannot be accessed in the user device 101, when the validation of the software configuration is not successful.

In an alternative embodiment, the client software module 106 already starts its normal operation before the validation process has been finished. In such normal operation mode, the client software module 106 may already control the user device 101 to decrypt content of the content provider associated with the client software module 106 and to provide such content to the playback device 103. For this purpose, the client software module 106 does particularly forward one or more control words received from the provider server 104 to the decryption software module 105*c*. When the validation of the software configuration of the user device 101 is then completed successfully, the client software module 106 continues its normal operation. However, when the validation process is completed (or terminated) unsuccessfully, it is preferably prevented that the user device 101 continues decrypting content of the provider and forwarding such content to the playback device 103. For this purpose, the component that carries out the provider specific validation sends a corresponding control command to the system software 105, which instructs the system software 105 to stop decryption of the content of the content provider. In addition or as an alternative, the client software module 106 may not forward new control words, which are issued in future cryptoperiods to the system software 105 so that the system software 105 is no longer capable of decrypting content of the provider after the current cryptoperiod has expired.

When the provider-specific validation process is completed unsuccessfully and the user device 101 is prevented from decrypting and/or providing content, the user device 101 preferably outputs a corresponding indication to the user of the user device 101. This indication may particularly be displayed to the user on the playback device 103 and/or on a further visual user interface of the user device 101. In one embodiment, the display of the indication may be controlled by the client software module 106 of the provider.

Advantageously, the indication displayed to the user may include information about the software module(s) which have not been validated successfully. Thus, the user can take appropriate measures for removing the cause of the failure of the validation process. In particular, the user may deactivate software modules which have not been validated successfully and/or replace currently installed releases of such software module by other releases, which are considered appropriate by the content provider.

Furthermore, the user device 101 validates further software modules, which are loaded during the operation of the client software module 106 after the successful completion of the validation process carried out during the initialization phase of this client software module 106 using the provider's revocation list. If the user device 101 determines in this process, that a newly loaded software module does not belong to the group of software modules which are defined as being appropriate by means of the revocation list, the user device 101 may in one embodiment behave in the same way as in case of an unsuccessful completion of the initial provider-specific validation process. Thus, the user device 101 may be prevented from further decrypting and/or providing content of the content provider. Moreover, the user device 101 may display an indication to the user as to the course of a stopping of the decryption and/or provision of the content similarly as explained above.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. A device for decrypting protected content and for providing the decrypted content for playback, the device comprising:

software, a memory for storing the software, and one or more processors on which the software runs, the software comprising: one or more system software modules providing functions for facilitating the decryption of the protected content and client software modules each being assigned to a provider of protected content, and being adapted to access functions of the system software modules in order to control the system software modules to decrypt the protected content of the provider, wherein the client software modules comprise a first client software module assigned to a first provider and a second client software module assigned to a second provider, wherein the device is adapted to validate the system software modules and to prevent the decryption or provision of the protected content of the first provider, if the system software modules are not validated successfully, the validation of the system software modules comprising a comparison of identification data of the system software modules with identification data included in a revocation list assigned to the first provider, and wherein content of the second provider can still be decrypted and provided for playback, if the validation of the system software modules using the revocation list assigned to the first provider is not successful.

2. The device according to claim 1, wherein the identification data of a system software module comprises a digest, particularly a hash value, of an image of the system software module.

3. The device according to claim 1, wherein an image of each system software module is provided with a digital signature created using a first cryptographic key uniquely allocated to the software image and wherein the device comprises a loader module adapted to verify the digital signature of a software image using a second cryptographic key allocated to the system software module before the system software module is loaded in the processor of the device.

4. The device according to claim 3, wherein the identification data used for validating a system software module uniquely identify the second cryptographic key allocated to the image of the system software module.

5. The device according to claim 3, wherein the device is configured to validate the second cryptographic key using a digital certificate including the second cryptographic key, and wherein the data uniquely identifying the second cryptographic comprise an identification of the digital certificate.

6. The device according to claim 4, wherein the device is configured to validate the second cryptographic key using a digital certificate including the second cryptographic key, and wherein the data uniquely identifying the second cryptographic comprise an identification of the digital certificate.

7. The device according to claim 1, wherein the first client software module is adapted to forward a control word for decrypting the protected content of the first provider to the system software modules and wherein the first client software module does not forward the control word, if the system software modules are not validated successfully.

8. A method of operating a device for decrypting protected content and for providing the decrypted content for playback, the device comprising:

software, a memory for storing the software, and one or more processors on which the software runs, the software comprising: one or more system software modules providing functions for facilitating the decryption of the protected content and client software modules each being assigned to a provider of protected content, and being adapted to access functions of the system software modules in order to control the system software modules to decrypt the protected content of the provider, wherein the client software modules comprise a first client software module assigned to a first provider and a second client software module assigned to a second provider, wherein the device is adapted to validate the system software modules and to prevent the decryption or provision of the protected content of the first provider, if the system software modules are not validated successfully, the validation of the system software modules comprising a comparison of identification data of the system software modules with identification data included in a revocation list assigned to the first provider, and wherein content of the second provider can still be decrypted and provided for playback, if the validation of the system software modules using the revocation list assigned to the first provider is not successful.

9. A device for decrypting protected content and for providing the decrypted content for playback, the device comprising:

software, a memory for storing the software, and one or more processors on which the software runs, the software comprising: one or more system software modules providing functions for facilitating the decryption of the protected content and client software modules each being assigned to a provider of protected content, and being adapted to access functions of the system software modules in order to control the system software modules to decrypt the protected content of the provider, wherein the client software modules comprise a first client software module assigned to a first provider and a second client software module assigned to a second provider, wherein the device is adapted to validate the second client software module and to prevent the decryption or provision of the protected content of the first provider, if the second client software module is not validated successfully, the validation of the second client software module comprising a comparison of identification data of the second client software module with identification data included in a revocation list assigned to the first provider, and wherein content of the second provider can still be decrypted and provided for playback, if the validation of the second client software module using the revocation list assigned to the first provider is not successful.

10. The device according to claim 9, wherein the identification data of the second client software module comprises a digest, particularly a hash value, of an image of the second client software module.

11. The device according to claim 9, wherein an image of the second client software module is provided with a digital signature created using a first cryptographic key uniquely allocated to the software image and wherein the device comprises a loader module adapted to verify the digital signature of a software image using a second cryptographic key allocated to the second client software module before the second client software module is loaded in the processor of the device.

12. The device according to claim 11, wherein the identification data used for validating the second client software module uniquely identify the second cryptographic key allocated to the image of the second client software module.

13. The device according to claim 11, wherein the device is configured to validate the second cryptographic key using a digital certificate including the second cryptographic key, and wherein the data uniquely identifying the second cryptographic comprise an identification of the digital certificate.

14. The device according to claim 12, wherein the device is configured to validate the second cryptographic key using a digital certificate including the second cryptographic key, and wherein the data uniquely identifying the second cryptographic comprise an identification of the digital certificate.

15. The device according to claim 9, wherein the validation of the second client software module comprises checking whether the second client software module is operated to control the device to decrypt and provide protected content of a provider that belongs to a predetermined group of providers.

16. The device according to claim 9, wherein the first client software module is adapted to forward a control word for decrypting the protected content of the first provider to the system software modules and wherein the first client software module does not forward the control word, if the second client software module is not validated successfully.

17. A method of operating a device for decrypting protected content and for providing the decrypted content for playback, the device comprising:

software, a memory for storing the software, and one or more processors on which the software runs, the software comprising: one or more system software modules providing functions for facilitating the decryption of the protected content and client software modules each being assigned to a provider of protected content, and being adapted to access functions of the system software modules in order to control the system to decrypt the protected content of the provider, wherein the client software modules comprise a first client software module assigned to a first provider and a second client software module assigned to a second provider, wherein the device validates the second client software module and prevents the decryption or provision of the protected content of the first provider, if the second client software module is not validated successfully, the validation of the second client software module comprising a comparison of identification data of the second client software module with identification data included in a revocation list assigned to the first provider, and wherein content of the second provider can still be decrypted and provided for playback, if the validation of the second client software module using the revocation list assigned to the first provider is not successful.

* * * * *